(12) United States Patent
Hunt et al.

(10) Patent No.: US 12,727,537 B2
(45) Date of Patent: Sep. 8, 2026

(54) AGRICULTURAL SYSTEM AND METHOD FOR ACCOUNTING FOR HILL-DRIFT STEERING DURING ROW GUIDANCE OF HARVESTERS

(71) Applicant: CNH Industrial America LLC, New Holland, PA (US)

(72) Inventors: Cory Douglas Hunt, Millersville, PA (US); Eric L. Walker, Narvon, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 18/923,938

(22) Filed: Oct. 23, 2024

(65) Prior Publication Data

US 2025/0127087 A1 Apr. 24, 2025

Related U.S. Application Data

(60) Provisional application No. 63/592,628, filed on Oct. 24, 2023.

(51) Int. Cl.
*A01D 41/127* (2006.01)
*A01B 69/04* (2006.01)
*A01D 45/02* (2006.01)

(52) U.S. Cl.
CPC ........ *A01D 41/1278* (2013.01); *A01B 69/008* (2013.01); *A01D 45/021* (2013.01)

(58) Field of Classification Search
CPC .............. A01D 41/1278; A01D 45/021; A01D 41/141; A01B 69/008
See application file for complete search history.

(56) References Cited

U.S. PATENT DOCUMENTS 6,377,881 B1 4/2002 Mullins
7,689,356 B2 3/2010 Dix et al.
(Continued)

FOREIGN PATENT DOCUMENTS

EP 3516946 A1 7/2019
EP 3516946 B1 7/2021
WO WO2020041156 A1 2/2020

OTHER PUBLICATIONS

European Search Report for Application No. EP 24208236.0, mailed Mar. 6, 2025, 9 pages.

*Primary Examiner* — Long T Tran
*Assistant Examiner* — Charles J Brauch
(74) *Attorney, Agent, or Firm* — Dority & Manning, P.A.

(57) ABSTRACT

An agricultural system for accounting for hill-drift steering during row guidance may include a harvester having a header supported forward of a main frame along a fore-aft direction. The agricultural system may further include a location detecting system that generates location data indicative of a location of at least two points of the harvester, where the at least two points may be spaced apart from each other and from a front end of the header along the fore-aft direction. The agricultural system may additionally include a computing system that receives the location data, determines an instantaneous heading of the harvester and an actual direction of travel of the harvester based at least in part on the location data, and performs a control action based at least in part on an angle between the instantaneous heading and the actual direction of travel.

18 Claims, 8 Drawing Sheets

(56) References Cited

U.S. PATENT DOCUMENTS

| | | | | |
|---|---|---|---|---|
| 8,359,141 | B1 | 1/2013 | Lange | |
| 10,820,508 | B2 | 11/2020 | Dix et al. | |
| 11,032,967 | B2 | 6/2021 | Connell et al. | |
| 11,112,802 | B2 | 9/2021 | Aberle et al. | |
| 2022/0000024 | A1 | 1/2022 | Zielke et al. | |
| 2022/0041156 | A1 | 2/2022 | Imamura | |
| 2022/0187832 | A1 | 6/2022 | Weidenbach et al. | |
| 2022/0197832 | A1 * | 6/2022 | Ruttenberg | G11C 11/4076 |

* cited by examiner

H1
DOT1
148
152
146
150
96
10
90
88
12
D1
74
102
104A
D2
100
104B
55
76,FA1
82

DOT1
H2
148
A1
152
150
146
10
L1
96
90
D1
88
12
74
102
104A
D2
100
104B
55
76,FA1
82

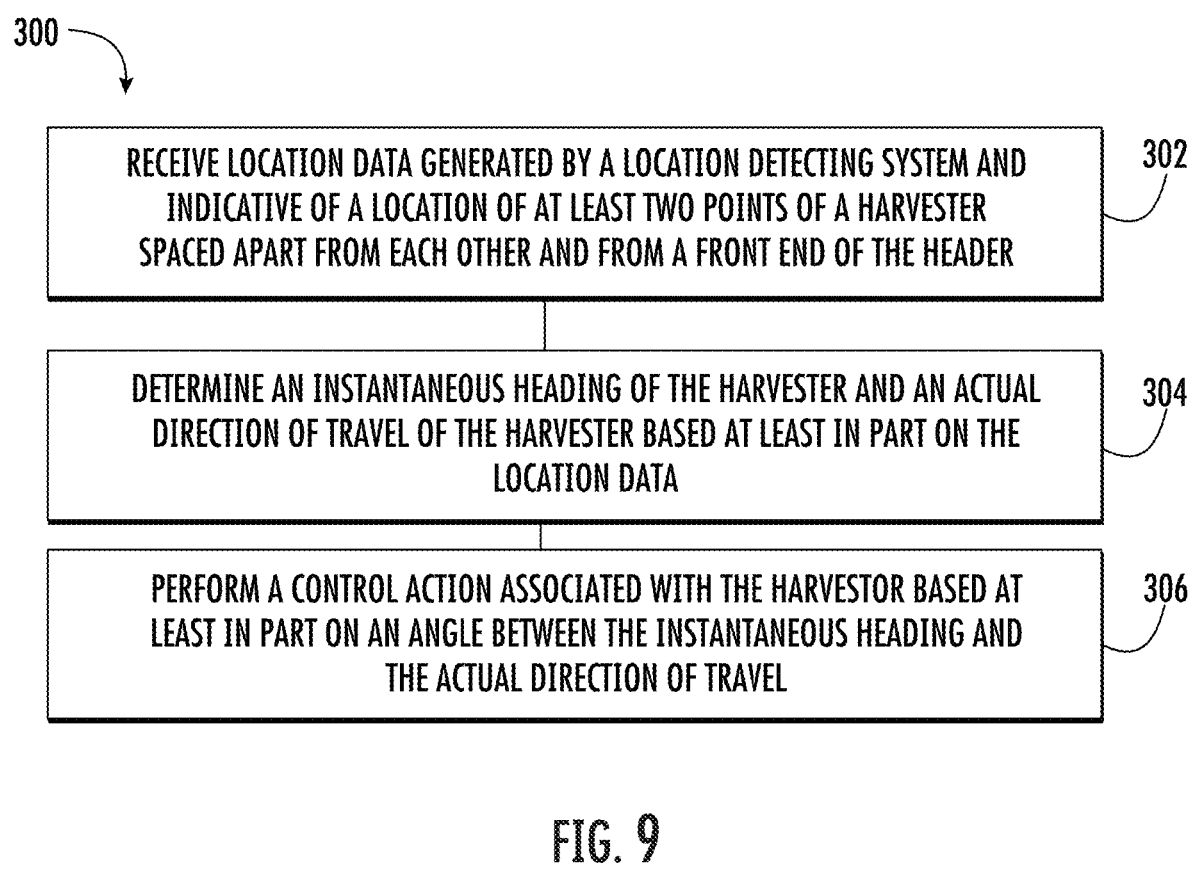

300

RECEIVE LOCATION DATA GENERATED BY A LOCATION DETECTING SYSTEM AND INDICATIVE OF A LOCATION OF AT LEAST TWO POINTS OF A HARVESTER SPACED APART FROM EACH OTHER AND FROM A FRONT END OF THE HEADER — 302

DETERMINE AN INSTANTANEOUS HEADING OF THE HARVESTER AND AN ACTUAL DIRECTION OF TRAVEL OF THE HARVESTER BASED AT LEAST IN PART ON THE LOCATION DATA — 304

PERFORM A CONTROL ACTION ASSOCIATED WITH THE HARVESTOR BASED AT LEAST IN PART ON AN ANGLE BETWEEN THE INSTANTANEOUS HEADING AND THE ACTUAL DIRECTION OF TRAVEL — 306

FIG. 9

AGRICULTURAL SYSTEM AND METHOD FOR ACCOUNTING FOR HILL-DRIFT STEERING DURING ROW GUIDANCE OF HARVESTERS

CROSS-REFERENCE TO RELATED APPLICATIONS

The present application is based upon and claims the right of priority to U.S. Provisional Patent Application No. 63/592,628, filed Oct. 24, 2023, the disclosure of which is hereby incorporated by reference herein in its entirety for all purposes.

FIELD OF THE INVENTION

The present disclosure relates generally to agricultural harvesters and, more particularly, to agricultural systems and methods for accounting for hill-drift steering during row guidance of agricultural harvesters.

BACKGROUND OF THE INVENTION

A harvester is an agricultural machine that is used to harvest and process crops. For instance, a forage harvester may be used to cut and comminute silage crops, such as grass and corn. Similarly, a combine harvester may be used to harvest grain crops, such as wheat, oats, rye, barley, corn, soybeans, and flax or linseed. In general, the objective is to complete several processes, which traditionally were distinct, in one pass of the machine over a particular part of the field. In this regard, most harvesters are equipped with a harvesting implement, such as a header, which cuts and collects the crop from the field and feeds it to the base harvester for further processing. The harvester also includes a crop processing system, which performs various processing operations (e.g., threshing, separating, cleaning, etc.) of the harvested crop received from the harvesting implement.

Many crops, such as corn and soybeans, are planted in rows. As such, when the harvester is moved across the field, it is desirable that the direction of travel of the harvester be generally aligned with the orientation of the crop rows so as to maximize harvesting efficiency. Generally, if the crop dividers are not well aligned with the crop rows, crop may be pushed down and under the header instead of into the header, which leads to crop loss. In this regard, some harvesters include a sensor(s), such a GNSS-based sensor(s) and/or a contact-based sensor(s), configured to detect the orientation of the harvester relative to the crop rows. However, such sensors have certain drawbacks. For instance, if the harvester is driving along the side of a hill, corrective steering uphill may be required in order to maintain the direction of travel. In this case, the direction of travel and the heading will not be aligned, which can lead to poor alignment between crop dividers of the header and the crop rows. For instance, the actual direction of travel of the harvester may be parallel to the crop rows, but the heading of the harvester may be angled relative to the crop rows. Moreover, readings from crop-row sensors on the dividers of the harvester that contact adjacent crop rows to determine the alignment of row dividers relative to adjacent rows of crop may be inaccurate due to such difference between the heading and the crop rows.

Accordingly, an improved row guidance system for an agricultural vehicle that accounts for hill-drift steering during row guidance would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to an agricultural system for accounting for hill-drift steering during row guidance of harvesters. The agricultural system may include a harvester having a main frame extending along a fore-aft direction and a header supported forward of the main frame along the fore-aft direction. The header may have a plurality of row dividers coupled to a header frame and spaced apart along a lateral direction of the header. The header may be configured to direct severed crop to a feeder of the harvester during a harvesting operation. The agricultural system may further include a location detecting system configured to generate location data indicative of a location of at least two points of the harvester, where the at least two points may be spaced apart from each other and from a front end of the header along the fore-aft direction. The agricultural system may additionally include a computing system. The computing system may be configured to receive the location data generated by the location detecting system, determine an instantaneous heading of the harvester and an actual direction of travel of the harvester based at least in part on the location data, and perform a control action based at least in part on an angle between the instantaneous heading and the actual direction of travel.

In another aspect, the present subject matter is directed to an agricultural method for accounting for hill-drift steering during row guidance of a harvester, where the harvester may have a main frame extending along a fore-aft direction and a header supported forward of the main frame along the fore-aft direction. The header may include a plurality of row dividers coupled to a header frame and spaced apart along a lateral direction of the header. The header may be configured to deliver severed crop to a feeder of the harvester during a harvesting operation. The method may include receiving, with a computing system, location data generated by a location detecting system, with the location data being indicative of a location of at least two points of the harvester, and with the at least two points being spaced apart from each other and from a front end of the header. The method may further include determining, with the computing system, an instantaneous heading of the harvester and an actual direction of travel of the harvester based at least in part on the location data. Additionally, the method may include performing, with the computing system, a control action associated with the harvester based at least in part on an angle between the instantaneous heading and the actual direction of travel.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 9 illustrates a flow diagram of one embodiment of a method for accounting for hill-drift steering during row guidance of agricultural harvesters in accordance with aspects of the present subject matter.

Figure 1:
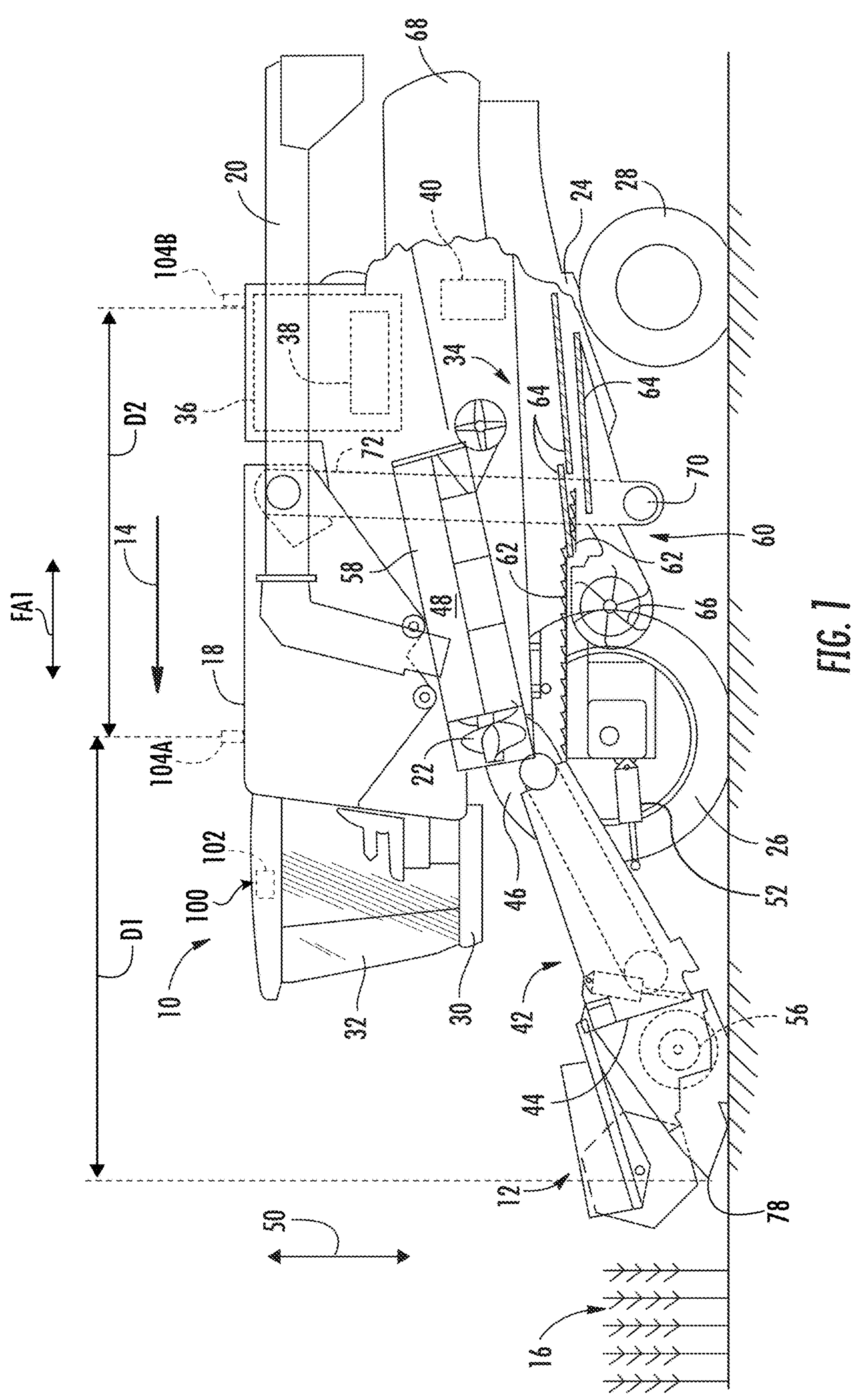
FIG. 1 illustrates a side view of one embodiment of an agricultural harvester in accordance with aspects of the present subject matter.

Repeat use of reference characters in the present specification and drawings is intended to represent the same or analogous features or elements of the present technology.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the terms "first," "second," and "third" may be used interchangeably to distinguish one component from another and are not intended to signify a location or importance of the individual components. The terms "coupled," "fixed," "attached to," and the like refer to both direct coupling, fixing, or attaching, as well as indirect coupling, fixing, or attaching through one or more intermediate components or features, unless otherwise specified herein. The terms "upstream" and "downstream" refer to the relative direction with respect to a harvested material within a fluid circuit. For example, "upstream" refers to the direction from which a harvested material flows, and "downstream" refers to the direction to which the harvested material moves. The term "selectively" refers to a component's ability to operate in various states (e.g., an ON state and an OFF state) based on manual and/or automatic control of the component.

Furthermore, any arrangement of components to achieve the same functionality is effectively "associated" such that the functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable, physically interacting components, wirelessly interactable, wirelessly interacting components, logically interacting, and/or logically interactable components.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," is not to be limited to the precise value specified. In at least some instances, the approximating language may correspond to the precision of an instrument for measuring the value, or the precision of the methods or apparatus for constructing or manufacturing the components and/or systems. For example, the approximating language may refer to being within a ten percent margin.

Moreover, the technology of the present application will be described in relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein will be considered exemplary.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination.

In general, the present subject matter is directed to systems and methods for accounting for hill-drift steering during row guidance of agricultural harvesters. Specifically, in several embodiments, a computing system of the disclosed system may be configured to help guide the harvester based on the difference between an instantaneous heading of the harvester and the actual direction of travel of the harvester to account for hill conditions. For instance, when the harvester is traveling on flat ground, the instantaneous heading and the actual direction of travel are generally the same, such that dividers of the header may be easily aligned between crop rows. However, when the harvester is traveling along the side of a hill, the harvester may begin to drift downhill, which requires corrective steering to counteract such drift, causing the instantaneous heading to differ from the actual direction of travel. When the heading and the direction of travel are not parallel, the dividers of the header may not properly align with crop rows if otherwise following a predetermined guidance path. Moreover, traveling along the side of a hill may create differences between the steering angle and the heading, such that the steering angle is not always accurate to use as the heading.

Thus, in accordance with aspects of the present subject matter, the disclosed system may include an improved location detecting system, where the location detecting system is able to generate location data indicative of a location of at least two points of the harvester, which are spaced apart from each other and from a front end of the header along a fore-aft direction of the harvester. From the location of the at least two points at a given moment, the instantaneous heading (effective steering angle) of the harvester may be known, even when the harvester is at a standstill, overcoming the errors of conventional techniques in determining the heading from steering angle due to hill drift and traction issues. Moreover, by monitoring changes in the location of the at least two points over a period of time, the actual direction of travel of the harvester may be known. Based on an angle between the instantaneous heading and the actual direction of travel, the alignment of the header relative to crop rows may be improved. For instance, by knowing the angle between the instantaneous heading and the actual direction of travel, the harvester may be steered and/or the row dividers may be actuated to account for such angle between the instantaneous heading and the actual direction of travel.

Figure 2:
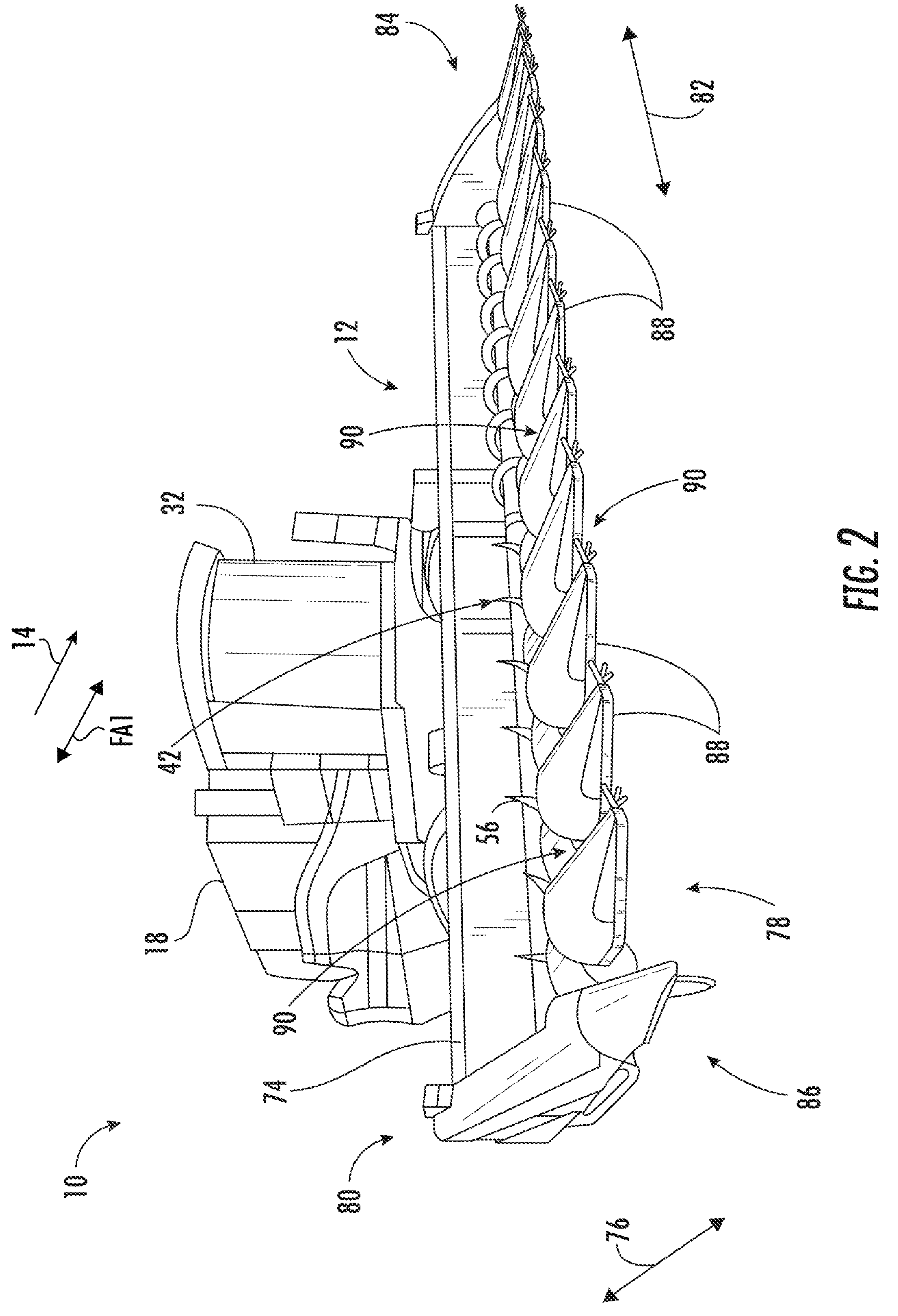
FIG. 2 illustrates a perspective view of the harvester shown in FIG. 1, particularly illustrating a header of the harvester in accordance with aspects of the present subject matter.

Referring now to the drawings, FIGS. 1 and 2 illustrate differing views of one embodiment of an agricultural harvester 10 in accordance with aspects of the present subject matter. Specifically, FIG. 1 illustrates a partial sectional side view of the agricultural harvester 10. Additionally, FIG. 2 illustrates a perspective view of the harvester 10, particularly illustrating a harvesting implement (e.g., a header 12) of the harvester 10.

In general, the harvester 10 may be configured to move across a field in a forward direction of travel (e.g., as indicated by arrow 14) to harvest a standing crop 16. As shown in FIG. 1, in one embodiment, the harvester 10 may be configured as an axial-flow type combine, wherein the harvested crop is threshed and separated while it is advanced by and along a longitudinally arranged rotor 22. The harvester 10 may include a chassis or main frame 24 extending along a fore-aft direction FA1 and configured to support and/or couple to various components of the harvester 10. For example, in several embodiments, the harvester 10 may include a pair of driven, ground-engaging front wheels 26 and a pair of steerable rear wheels 28 that are coupled to the frame 24. As such, the wheels 26, 28 may be configured to support the harvester 10 relative to the ground and move the harvester 10 in the forward direction of travel 14 (generally parallel to the fore-aft direction FA1). Furthermore, the harvester 10 may include a steering system having one or more steering actuators 40 configured to adjust the orientation of the steerable wheels 28 relative to the frame 24. For example, the steering actuator 40 may correspond to an electric motor, a linear actuator, a hydraulic cylinder, a pneumatic cylinder, or any other suitable actuator coupled to suitable mechanical assembly, such as a rack and pinion or a worm gear assembly. Moreover, the harvester 10 may include an operator's platform 30 having an operator's cab 32, a crop processing system 34, the crop tank 18, and a crop discharge tube 20 that are supported by the frame 24. Additionally, the harvester 10 may include an engine 36 and a transmission 38 mounted on the frame 24. The transmission 38 may be operably coupled to the engine 36 and may provide variably adjusted gear ratios for transferring engine power to the wheels 26 via a drive axle assembly (or via axles if multiple drive axles are employed).

Moreover, as shown in FIG. 1, the header 12 and an associated feeder 42 of the crop processing system 34 may extend forward of the frame 24 and may be pivotally secured thereto for generally vertical movement. In general, the feeder 42 may be configured to serve as support structure for the header 12. As shown in FIG. 1, the feeder 42 may extend between a front end 44 coupled to the header 12 and a rear end 46 positioned adjacent to a threshing and separating assembly 48 of the crop processing system 34. As is generally understood, the rear end 46 of the feeder 42 may be pivotally coupled to a portion of the harvester 10 to allow the front end 44 of the feeder 42 and, thus, the header 12 to be moved upward and downward along a vertical direction (e.g., as indicated by arrow 50) relative to the ground to set the desired harvesting or cutting height for the header 12 and/or laterally relative to the frame 24. For example, in one embodiment, the harvester 10 may include one or more height actuator(s) 52 coupled between the feeder 42 and the frame 24 such that the height actuator 52 may pivot the feeder 42 to raise and lower the header 12 relative to the ground. Similarly, in some embodiments, the harvester 10 may include one or more lateral actuators 53 (FIG. 8) configured to pivot the feeder 42 to move the header 12 left and right relative to the frame 24. In addition, the harvester 10 may include one or more tilt actuator(s) 54 coupled between the header 12 and the feeder 42 to allow the header 12 to be tilted relative to the ground surface or pivoted laterally or side-to-side relative to the feeder 42. As such, the actuator(s) 52, 53, 54 may correspond to a fluid-driven actuator(s), such as a hydraulic or pneumatic cylinder(s), an electric linear actuator(s), or any other type of suitable actuator(s).

As the harvester 10 is propelled forwardly over the field with the standing crop 16, the crop material is severed from the stubble by a plurality of snapping rolls (not shown) and associated stripping plates (not shown) at the front of the header 12 and delivered by material transfer device (e.g., a header auger 56, a header conveyor, etc.) to the front end 44 of the feeder 42, which supplies the harvested crop to the threshing and separating assembly 48.

For instance, referring now to FIG. 2, the header 12 may include a header frame 74. In general, the frame 74 may extend along a longitudinal direction 76 between a front end 78 and an aft end 80. The frame 74 may also extend along a lateral direction 82 between a first side 84 and a second side 86. In this respect, the frame 74 may be configured to support or couple to a plurality of components of the header 12. For example, a plurality of cones or row dividers 88 and the header auger 56 may be supported by the header frame 74, generally spaced apart along the lateral direction 82 of the header 12. Additionally, the snapping rolls (not shown) and associated stripping plates (not shown) may also be supported on and coupled to the frame 74.

In several embodiments, as shown in FIG. 2, the header 12 may be configured as a corn header. In such embodiments, the plurality of row dividers 88 may extend forward from the header frame 74 along the longitudinal direction 76. Moreover, the row dividers 88 may be spaced apart along the lateral direction 82 of the header frame 74, with each adjacent pair of row dividers 88 defining an associated stalkway 90 therebetween. As the harvester 10 is moved across the field, the row dividers 88 separate the stalks of the crop such that the separated stalks are guided into the stalkways 90. Thereafter, as is generally understood, the snapping rolls (not shown) pull the stalks downwardly onto the associated stripping plates (not shown) such that the ears of the standing crop 16 are snapped from the associated stalks upon contact with the stripping plates. The auger 56 may then convey the harvested ears to the feeder 42 for subsequent processing by the crop processing system 34 (FIG. 1). In some instances, the row dividers 88 may be movable relative to the header frame 74. For instance, the header 12 may have one or more divider actuator(s) 89 (FIG. 8) for changing an angle between the row dividers 88 and the heading of the harvester 10. However, it should be appreciated that, in alternative embodiments, the header 12 may be configured as any other suitable type of harvesting implement.

Referring back to FIG. 1, as is generally understood, the threshing and separating assembly 48 may include a cylindrical chamber 58 (e.g., concave rotor cage) in which the rotor 22 is rotated to thresh and separate the harvested crop received therein. That is, the harvested crop is rubbed and beaten between the rotor 22 and the inner surfaces of the chamber 58, whereby the grain, seed, or the like, is loosened and separated from the straw or material other than grain or "MOG". The harvested crop 16 that has been separated by the threshing and separating assembly 48 may fall onto a crop cleaning assembly 60 of the crop processing system 34.

In general, the crop cleaning assembly 60 may include a series of pans 62 and associated sieves 64. As is generally understood, the separated harvested crop 16 may be spread out via oscillation of the pans 62 and/or sieves 64 and may eventually fall through apertures defined in the sieves 64. Additionally, a cleaning fan 66 may be positioned adjacent to one or more of the sieves 64 to provide an air flow through the sieves 64 that remove chaff and other impurities from the harvested crop 16. For instance, the fan 66 may blow the impurities off of the harvested crop 16 for discharge from the harvester 10 through the outlet of a straw hood 68 positioned at the back end of the harvester 10. The cleaned harvested crop 16 passing through the sieves 64 may then fall into a trough of an auger 70, which may be configured to transfer the harvested crop 16 to an elevator 72 for delivery to the crop tank 18. The harvested crop may be unloaded from the crop tank 18 for receipt by a crop receiving vehicle (not shown) via the crop discharge tube 20 of the harvester 10.

Additionally, as shown in FIG. 1, in accordance with aspects of the present subject matter and as will be described in greater detail below, the harvester 10 may include a location detecting system 100 configured to generate location data indicative a parameter associated with a geographical or physical location of the harvester 10 within the field. For instance, in one embodiment, the location detecting system 100 may include a Global Positioning System (GPS) receiver 102 configured to generate data indicative of the GPS coordinates or other GPS data of the harvester 10, such as of the location of at least two antennas (e.g., a first antenna 104A and a second antenna 104B) on the harvester 10 in communication with the receiver 102. More particularly, in accordance with aspects of the present subject matter, the antennas 104A, 104B may be spaced apart from each other along the fore-aft direction FA1, and from a front end 78 of the header 12. For example, the first antenna 104A may be supported adjacent to or on the operator's cab 32, spaced apart from the front end 78 of the header 12 by a first distance D1 along the fore-aft direction FA1. In some instances, as shown in FIG. 1, the first antenna 104A is positioned substantially directly vertically above a non-steering axle (e.g., the axle for the front wheels 26). Similarly, the second antenna 104B may be aft of the first antenna 104A along the fore-aft direction FA1 by a second distance D2, such as at the rear end of the roof of the harvester 10 along the fore-aft direction FA1.

It should be appreciated that, in other embodiments, the antenna(s) 104A, 104B may be spaced apart from the non-steering axle along the fore-aft direction FA1. It should further be appreciated that, in other embodiments, the antennas 104A, 104B may be positioned at any other suitable location on or within the harvester 10, such as on the housing of the feeder 42. Moreover, it should be appreciated that, in some embodiments, one or more of the antennas 104A, 104B may be integrated into a sensor unit with the receiver 102. Additionally, it should be appreciated that the location detecting system 100 may include any other suitable number of receivers 102 and any other suitable number of antennas. As will be described in greater detail below, the location data generated by the location detecting system 100 indicative of the locations of the antennas 104A, 104B may be used to determine an instantaneous heading (orientation) of the harvester 10 in addition to the actual direction of travel (e.g., orientation of the forward direction 14).

It should be appreciated that, in alternative embodiments, the location detecting system 100 may generate any suitable type of GNSS-based data and be configured in any other suitable manner. Moreover, in some instances, the location detecting system 100 may also include an inertial measurement unit (IMU). For example, in one embodiment, the IMU may include three perpendicular accelerometers and three perpendicular yaw rate sensors. As such, the IMU may allow for correction of the location data for roll and/or tilt of the harvester 10 and translation of the location data to the ground. Furthermore, data from the IMU may be used in addition to the location data to determine the heading and/or direction of travel of the harvester 10.

It should further be appreciated that the configurations of the harvester 10 and the header 12 described above and shown in FIGS. 1 and 2 are provided only to place the present subject matter in an exemplary field of use. Thus, it should be appreciated that the present subject matter may be readily adaptable to any manner of harvester and/or header configuration.

Figure 3:
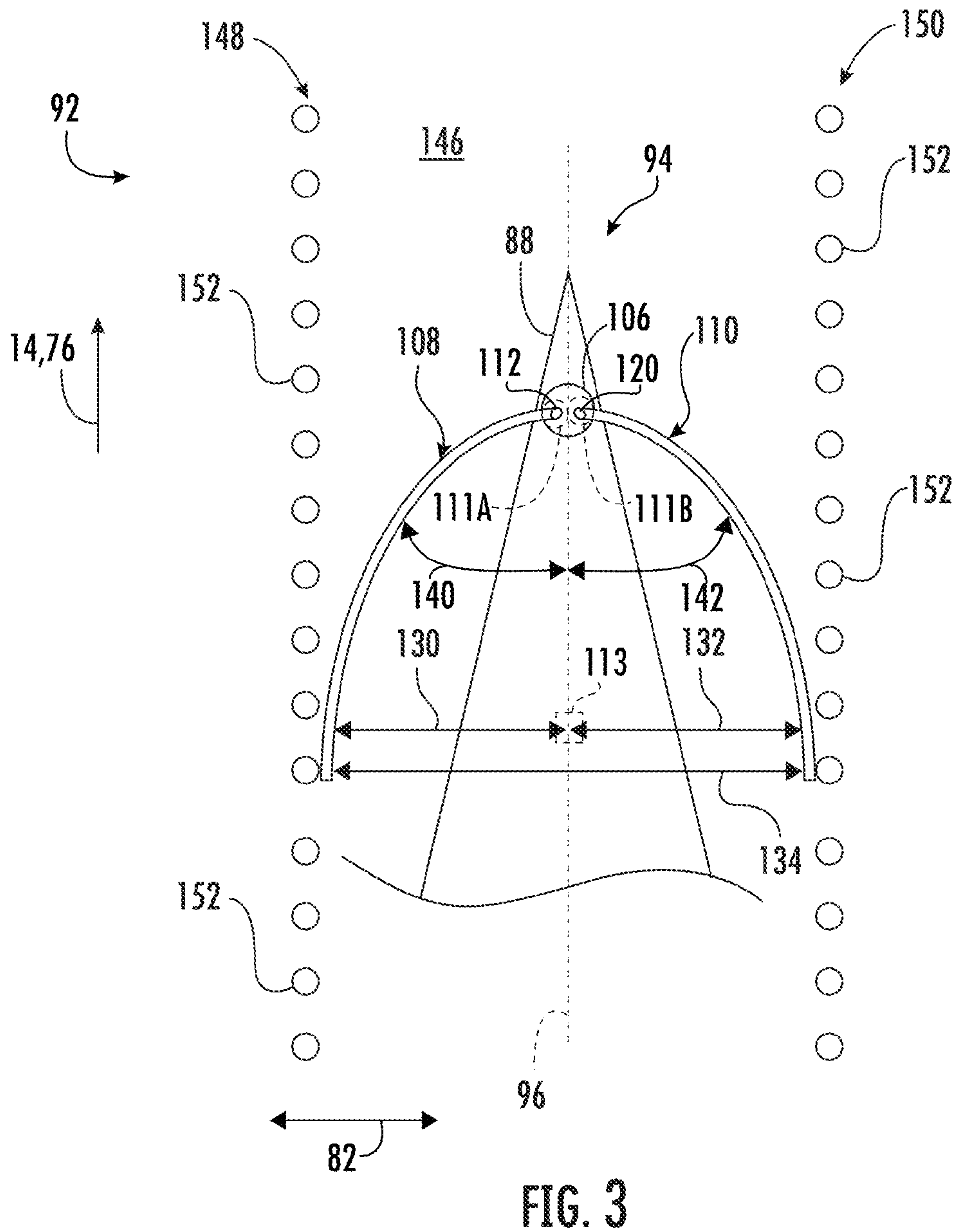
FIG. 3 illustrates a top view of one embodiment of a sensor assembly suitable for use on the harvester shown in FIGS. 1 and 2 in accordance with aspects of the present subject matter, particularly illustrating the sensor assembly being mounted to a row divider of the header.

Referring now to FIG. 3, one embodiment of a crop row sensor assembly 92 for use on a harvesting implement of an agricultural harvester is illustrated in accordance with aspects of the present subject matter. In general, the crop row sensor assembly 92 will be described herein with reference to the harvester 10 and the header 12 described above with reference to FIGS. 1 and 2. However, it should be appreciated by those of ordinary skill in the art that the disclosed sensor assembly 92 may generally be utilized with harvesters having any other suitable harvester configuration and/or harvesting implements having any other suitable implement configuration.

In several embodiments, a single one of the crop row sensor assemblies 92 is mounted on one of the row dividers 88 of the header 12 of the harvester 10. It should be appreciated that such sensor assembly 92 may be mounted on any row divider 88 of the header 12. Furthermore, it should be appreciated that, in alternative embodiments, any suitable number of sensor assemblies 92 may be mounted on the row dividers 88 of the header 12, such as by installing two or more sensor assemblies 92 on respective row dividers 88 of the header 12.

The sensor assembly 92 may generally include a base member 106 pivotably coupled to the row dividers 88 on which the sensor assembly 92 is mounted. For example, the base member 106 may be installed into an aperture defined by the row divider 88 in a manner that permits the base member 106 to rotate within the aperture relative to the row divider 88. In one embodiment, the aperture may be defined at a forward end 94 of the row divider 88 and/or along a centerline 96 of the row divider 88. Furthermore, the base member 106 may define first and second apertures 112, 120 configured to receive proximal ends of first and second arms 108, 110 of the sensor assembly 92, respectively. However, it should be appreciated that, in alternative embodiments, the base member 106 may have any other suitable configuration.

The first and second arms 108, 110 of the sensor assembly 92 may be separately pivotally coupled to the base member 106. Furthermore, as shown in FIG. 3, the first arm 108 may extend in a rest position from its proximal end at the base member 106 outwardly along the lateral direction 82 from the row divider centerline 96 and rearwardly along the longitudinal direction 76 toward its distal end. Similarly, the second arm 110 may extend in a rest position from its proximal end at the base member 106 outwardly along the lateral direction 82 from the row divider centerline 96 and rearwardly in the longitudinal direction 76 toward its distal end. For instance, each arm 108, 110 may define a generally arcuate shape or profile. As shown, the arms 108, 110 may extend outwardly from the row divider centerline 96 in opposed directions. In this regard, as will be described below, the first and second arms 108, 110 may be configured to move from the rest positions when contacting adjacent crop rows as the harvester 10 travels across the field. In one embodiment, the arms 108, 110 may generally be flexible (e.g., able to elastically deform upon contact with crops row). However, it should be appreciated that, in alternative embodiments, the first and second arms 108, 110 may have any other suitable configuration(s).

It should further be appreciated that the sensor assembly 92 may include one or more biasing elements (not shown) configured to bias the first and second arms 108, 110 outwardly relative to the row divider centerline 96. As such, the first arm 108 may be biased outwardly relative to the row divider centerline 96 such that a first distance (e.g., as indicated by arrow 130 in FIG. 3) is defined between the distal end of the first arm 108 and the row divider centerline 96. Similarly, the second arm 110 may be biased outwardly relative to the row divider centerline 96 such that a second distance (e.g., as indicated by arrow 132 in FIG. 3) is defined between the distal end of the second arm 110 and the row divider centerline 96. As shown, the first and second distances 130, 132 may collectively define a total distance (e.g., as indicated by arrow 134 in FIG. 3) between the distal ends of the first and second arms 108, 110. In general, the total distance 134 when the arms 108, 110 are not in contact with a pair of crops rows may generally be greater than the nominal distance of an alley 146 between such crops rows (e.g., a first row 148 of crops 152 and an adjacent, second row 150 of crops 152). Additionally, in one embodiment, the biasing element(s) may be configured such that contact with weeds does not pivot the arms 108, 110 relative to the base member 106, but that the standing crop is able to pivot the arms 108, 110 relative to the base member 106 without toppling the crop. The biasing element(s) may be configured as coil springs. However, it should be appreciated that the biasing element(s) may be configured as any other suitable type of biasing elements.

In several embodiments, the sensor assembly 92 may further include one or more sensing devices, also referred to as crop row sensors, (e.g., first sensing device 111A and second sensing device 111B) configured to generate data indicative of the distance 134 defined between the arms 108, 110. For example, in one embodiment, the first sensing device 111A may be configured to detect a first pivot angle (e.g., as indicated by arrow 140 in FIG. 3) defined between the first arm 108 and the row divider centerline 96. Similarly, the second sensing device 111B may be configured to detect a second pivot angle (e.g., as indicated by arrow 142 in FIG. 3) defined between the second arm 110 and the row divider centerline 96. The distance 134 may be determined based on the detected first and second angles 140, 142 (e.g., based on established correlations between the first angle 140 and the distance 130, between the second angle 142 and the distance 132, and/or the like). The sensing devices 111A, 111B may be any suitable sensing devices, such as, for example, angular potentiometers, and/or any other suitable type of sensing devices or combinations of sensing devices. In some instances, the distances 130, 132 may be used to account for signal drift of GNSS-based row guidance when the harvester 10 is being steered along a pre-determined path.

Alternatively, or additionally, it should be appreciated that the harvester 10 may include or be in communication with non-contact based crop row sensor(s) 113 configured to generate data indicative of the distances 130, 132 for one or more of the row divider(s) 88. For instance, the non-contact crop row sensor(s) 113 may include a camera(s), a laser line sensor(s), an infrared sensor(s), an ultrasonic sensor(s), a LIDAR sensor(s), a radar sensor(s), and/or the like. In some embodiments, the non-contact crop row sensor(s) 113 may include satellites configured to generate georeferenced images of the field, where the location of the harvester 10 within the field may be used to estimate the distances 130, 132.

Figures 4, 5:
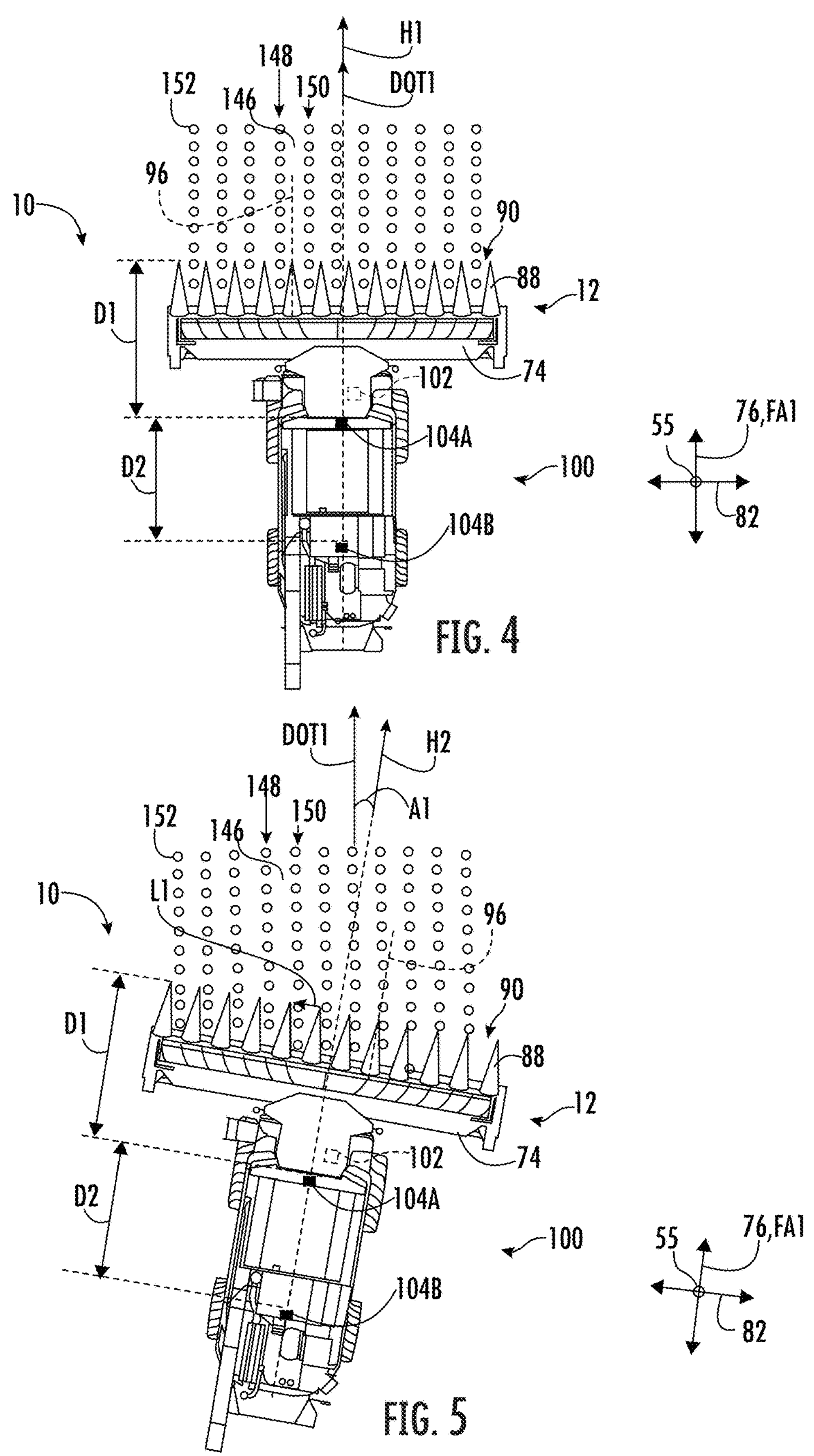
FIG. 4 illustrates a top view of the harvester shown in FIGS. 1-2 in accordance with aspects of the present subject matter, particularly illustrating a heading and direction of travel of the harvester when the harvester is traveling on flat ground.
FIG. 5 illustrates a top view of the harvester shown in FIGS. 1-2 in accordance with aspects of the present subject matter, particularly illustrating a lateral offset of the harvester determined based on a heading and direction of travel of the harvester when the harvester is traveling on a hill.
Figure 6:
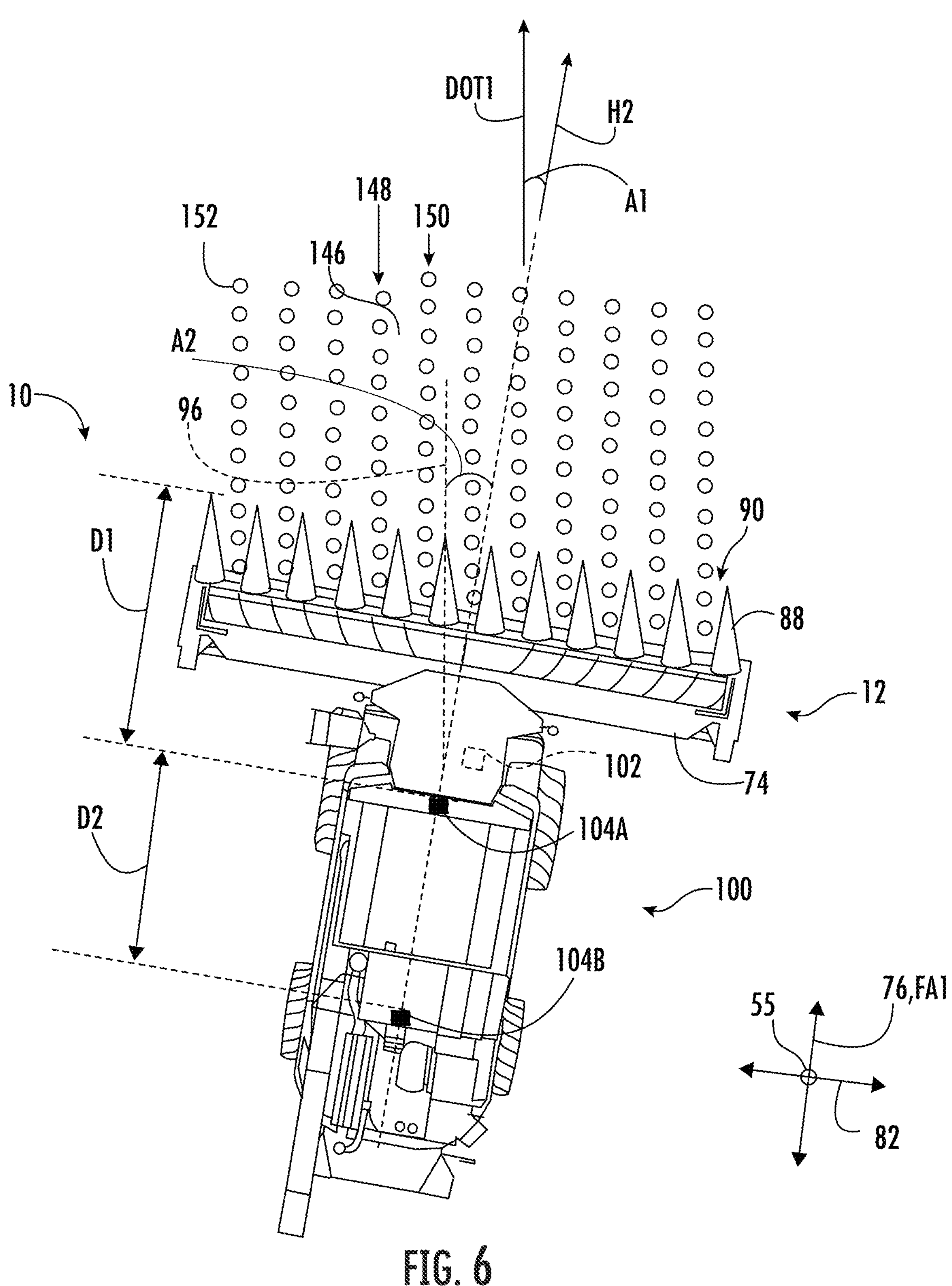
FIG. 6 illustrates another top view of the harvester shown in FIGS. 1-2 in accordance with aspects of the present subject matter, particularly illustrating changing an angle of row dividers based on a heading and direction of travel of the harvester when the harvester is traveling on a hill.
Figure 7:
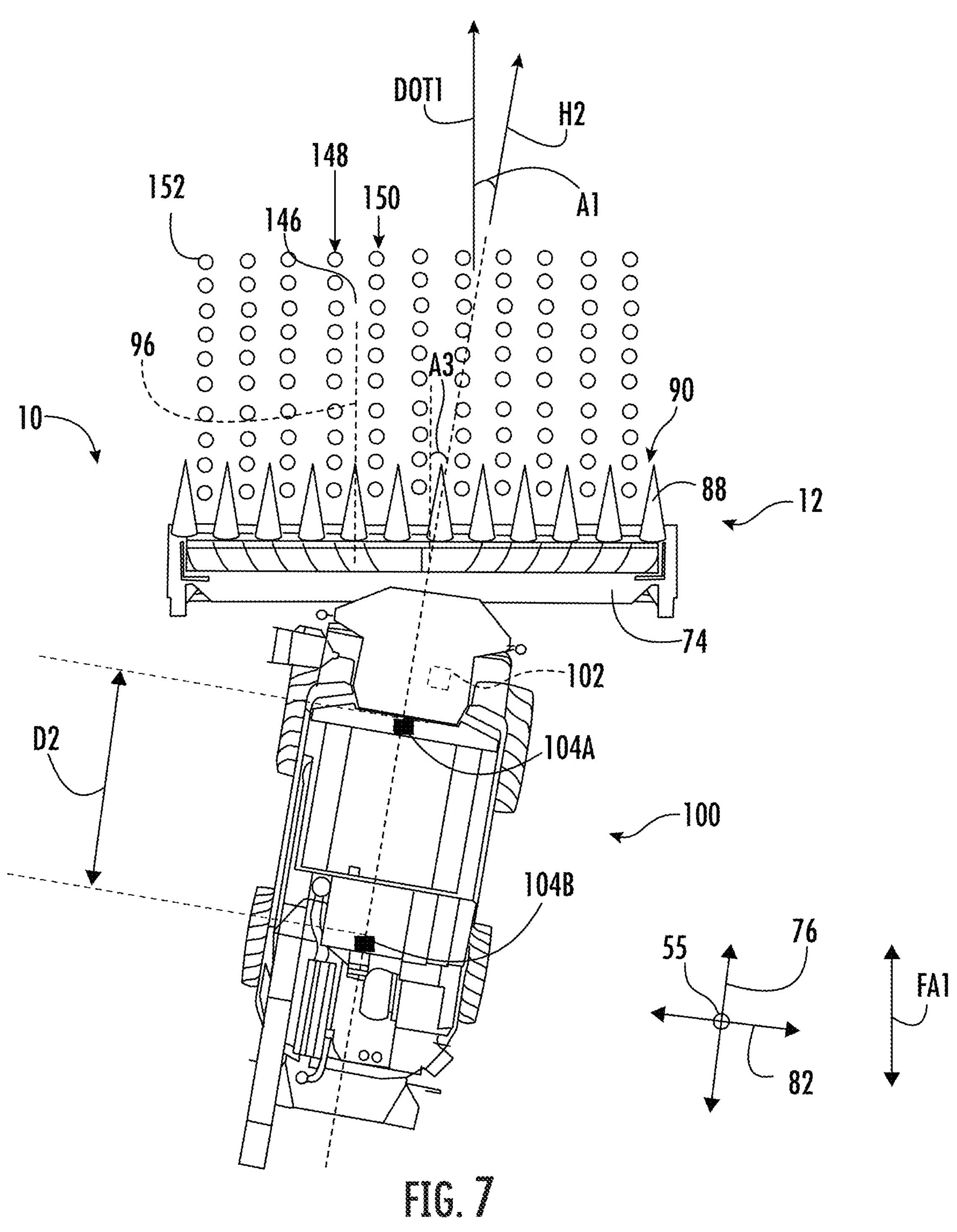
FIG. 7 illustrates a further top view of the harvester shown in FIGS. 1-2 in accordance with aspects of the present subject matter, particularly illustrating changing an angle of the header based on a heading and direction of travel of the harvester when the harvester is traveling on a hill.

Referring now to FIGS. 4-7, various top views of a harvester (e.g., harvester 10) are illustrated in accordance with aspects of the present subject matter. More particularly, FIG. 4 illustrates a heading and direction of travel of the harvester 10 when the harvester 10 is traveling on flat ground, and FIGS. 5-7 illustrate a heading and direction of travel of the harvester when the harvester is traveling on a hill and a resulting lateral offset.

In general, when the harvester 10 is traveling on flat ground, as in FIG. 4, a heading H1 and a direction of travel DOT1 of the harvester 10 are substantially the same such that the centerline 96 of the row dividers 88, may generally be aligned or parallel to the crop rows (e.g., crop rows 148, 150), in alleys (e.g., alley 146) between pairs of crop rows. In such instances, the distances 130, 132 (FIG. 3) determined from the data generated by the sensor assembly(ies) 92 (FIG. 3) are accurate and indicative of the centering of row dividers 88 between adjacent rows of crop (e.g., rows 148, 150). For instance, when the row dividers 88 are substantially centered in the alleys 146, the distances 130, 132 (FIG. 3) are substantially equal and the rows of crop (e.g., rows 148, 150) are generally brought into the center of the stalkways 90. As such, the data from the sensor assembly (ies) 92 (FIG. 3) may be accurate enough when the harvester 10 is traveling on flat ground to help guide the harvester 10 with or without a predetermined guidance path.

However, when the harvester 10 is traveling on the side of a hill, the harvester 10 may have to be steered slightly uphill to counteract downhill drift and maintain the direction of travel DOT1 parallel to the crop rows, and optionally, keep the harvester 10 on a predetermined guidance path. As such, as shown in FIGS. 5-7 the heading H2 of the harvester 10 may differ from the direction of travel DOT1 by an angle A1, while the direction of travel DOT1 may still be properly oriented such that the harvester 10 is properly following the crop rows and/or a guidance path. Though, in such instance, when the centerlines 96 of the row dividers 88 are aligned parallel with the heading H2, as in FIG. 5, the centerline 96 of the row dividers 88 may therefore also be at the angle A1 relative to the crop rows, which means that the dividers 88 may no longer be best aligned with the crop rows. For example, the dividers 88 may end up knocking down some of the crop rows (as seen with the rightmost rows of crop in FIG. 5). When evaluating the data from the sensing assembly(ies) 92 alone, it may be incorrectly assumed that the angle A1 between the centerline 96 of the row divider(s) 88 and the crop rows is also the angle between the direction of travel DOT1 and the crop rows 148, 150, which may cause the heading to be changed, thus, undoing the hill-drift steering. In some instances, data from an IMU and/or steering angle sensors may be used to try to account for the difference between the heading and direction of travel but, depending on traction conditions between the harvester 10 and the field, such supplemental data may not be enough to able to accurately determine the difference.

Thus, as will be described in greater detail below, the location data from the location detecting system 100 indicative of the location of the at least two points on the harvester 10 (e.g., of the at least two antennas 104A, 104B) may be used to accurately determine both the instantaneous heading H1, H2 of the harvester 10 and the actual direction of travel DOT1 of the harvester 10 to account for hill-drift steering during row guidance.

Figure 8:
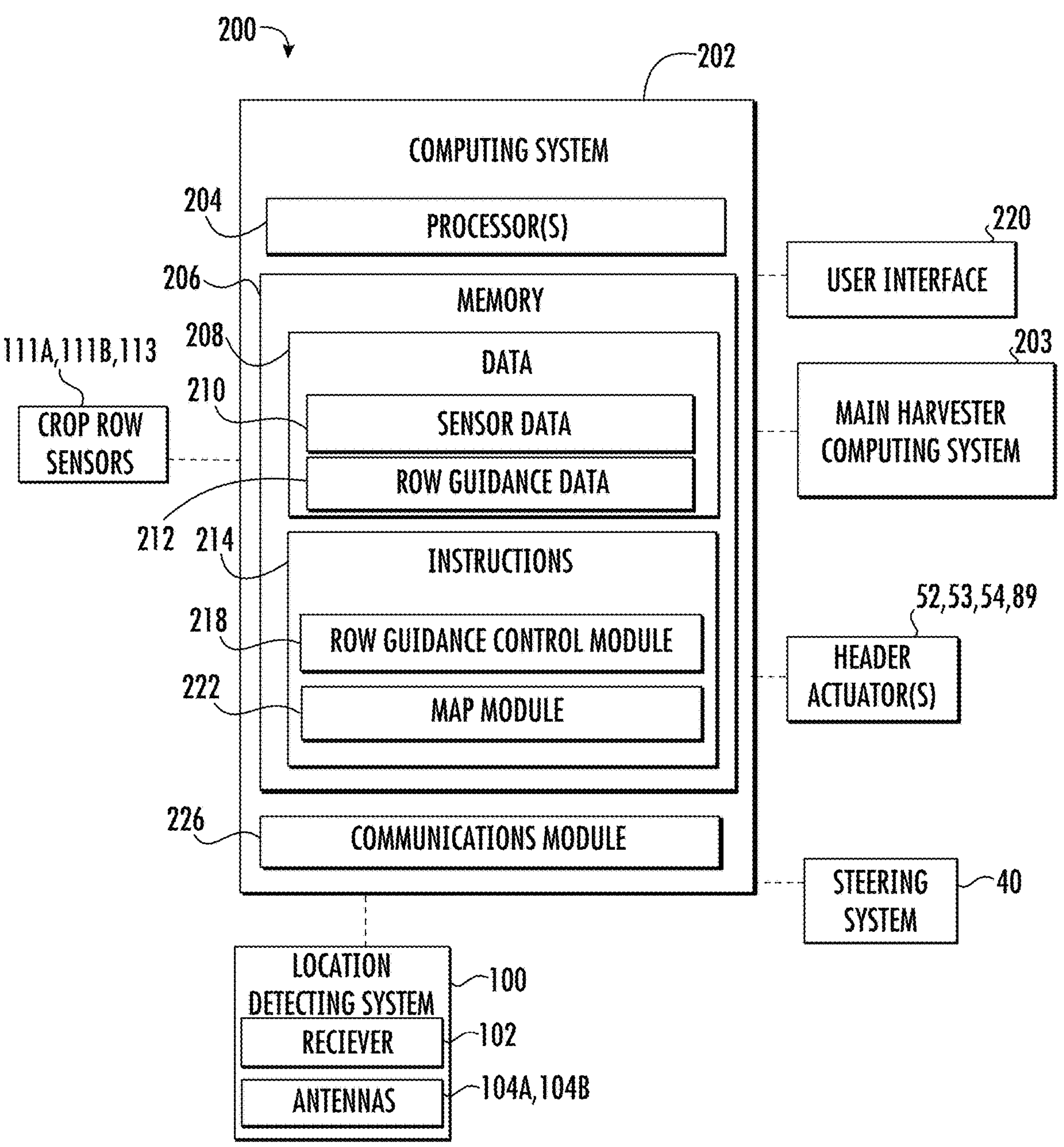
FIG. 8 illustrates a schematic view of a system for accounting for hill-drift steering during row guidance of agricultural harvesters in accordance with aspects of the present subject matter.

Referring now to FIG. 8, a schematic view of one embodiment of a control system 200 for accounting for hill-drift steering during row guidance of agricultural harvesters (e.g., harvester 10) is illustrated in accordance with aspects of the present subject matter. In general, the control system 200 will be described herein with reference to the harvester 10 described with reference to FIGS. 1-2, the crop row sensor assembly 92 described with reference to FIG. 3, and the example operating conditions of FIGS. 4-7. However, it should be appreciated that the disclosed control system 200 may be used with any suitable agricultural work vehicle having any other suitable vehicle configuration, with any other crop row sensor assembly 92 having any other suitable sensor configuration, and with any other applicable operating conditions.

As shown, the control system 200 may include any combination of components of the harvester 10 described above. For instance, the system 200 may include: a steering system, such as the steering system having the steering actuator(s) 40; header actuators, such as the header actuators 52, 53, 54, 89; a location detecting system, such as the location detecting system 100 having the receiver 102 and the at least the two antennas 104A, 104B; and sensors, such as one or more pairs of the contact-based crop row sensors 111A, 111B and/or the non-contact crop row sensor(s) 113. In some instances, the control system 200 may also include one or more user interfaces 220 associated with the harvester 10. In general, the user interface(s) 220 may correspond to any suitable input device(s) configured to allow the operator to provide operator inputs to the control system 200, such as a touch screen display, a keyboard, joystick, buttons, knobs, switches, and/or combinations thereof located within the cab 32 of the harvester 10. The operator may provide various inputs into the system 202 via the user interface(s) 220. The user interface(s) 220 may additionally, or alternatively, include one or more output devices, such as display screens, speakers, warning lights, and/or the like, which are configured to provide feedback to the operator from the control system 200.

Moreover, as shown in FIG. 8, the control system 200 may include a computing system 202 installed on and/or otherwise provided in operative association with the harvester 10. In general, the computing system 202 may correspond to any suitable processor-based device(s), such as a computing device or any combination of computing devices. Thus, in several embodiments, the computing system 202 may include one or more processor(s) 204 and associated memory device(s) 206 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 206 of the computing system 202 may generally comprise memory element(s) including, but not limited to, computer readable medium (e.g., random access memory (RAM)), computer readable non-volatile medium (e.g., a flash memory), a compact disc-read only memory (CD-ROM), a magneto-optical disk (MOD), a digital versatile disc (DVD) and/or other suitable memory elements. Such memory device(s) 206 may generally be configured to store suitable computer-readable instructions that, when implemented by the processor(s) 204, configure the computing system 202 to perform various computer-implemented functions, such as one or more aspects of the control algorithms and/or methods described herein.

In some instances, the computing system 202 may be, or may be coupled to, a main computing system 203 of the harvester 10 configured to control the operation of the crop processing system, trailing the feeder 34.

In one embodiment, the memory 206 of the computing system 202 may include one or more databases for storing information associated with the operation of the harvester 10, including data 208 associated with guidance of the harvester 10. For instance, as shown in FIG. 8, the memory 206 may include a sensor database 210 for storing location data provided by the location detecting system 100 that is associated with the locations of the at least two antennas

104A, 104B. Specifically, the computing system 202 may be communicatively coupled (directly or indirectly) to the location detecting system 100 to allow the location data indicative of the locations of the at least two antennas 104A, 104B generated by the location detecting system 100 (e.g., indicative of the heading and the direction of travel of the harvester 10) to be transmitted to the computing system 202. As such, the computing system 202 may be configured to continuously or periodically monitor and store the location data indicative of the locations of the at least two antenna 104A, 104B of the harvester 10 for subsequent processing and/or analysis.

Similarly, the sensor database 210 may store row data provided by the one or more pairs of crop row sensors 111A, 111B and/or the crop row sensor(s) 113. Specifically, the computing system 202 may be communicatively coupled (directly or indirectly) to the one or more pairs of crop row sensors 111A, 111B to allow the row data indicative of the rotation of the sensor arms 108, 110 of the associated row dividers 88 generated by the one or more pairs of crop row sensors 111A, 111B (e.g., indicative of the location of the associated row dividers 88 relative to the respective directly adjacent pair of crop rows 148, 150) and/or the crop row sensor(s) 113 to allow the row data indicative of the distance (s) 130, 132 between the associated row divider(s) 88 relative to the adjacent pair of crop rows 148, 150 generated by the crop row sensor(s) 113 to be transmitted to the computing system 202. As such, the computing system 202 may be configured to continuously or periodically monitor and store the row data indicative of the rotation of the sensor arms 108, 110 of the associated row dividers 88 for subsequent processing and/or analysis.

Additionally, the memory 206 may include a row guidance database 212 configured to store a guidance map for guiding the harvester 10 through the field during a harvesting operation. For instance, the guidance map may provide a path for guiding or steering the harvester 10 through the field. The guidance map may be generated based at least in part on data collected during a previous agricultural operation within the field, such as a planting or spraying operation, and/or based on any other suitable information.

The memory 206 may store instructions 214 that, when executed by the processor(s) 204, configure the computing system 202 to execute a row guidance control module 218. For instance, the control module 218 may be configured to control one or more components of the harvester 10. For example, the control module 218 may generally be configured to control an operation of the steering system 40 to steer the harvester 10 through the field. In accordance with aspects of the present subject matter, the control module 218 may automatically or semi-automatically (e.g., with some operator input or suggesting actions to an operator) perform hill-drift steering to allow the harvester 10 to remain on the guidance path when driving along the side of a hill. Moreover, the control module 218 may control an operation of the header actuator(s) 52, 53, 54, 89 according to the guidance map 212 and/or control the user interface(s) 220 to display or otherwise indicate the path provided by the guidance map 212 to an operator. However, it should be appreciated that the control module 218 may also be configured to assist during manual steering operations and/or with or without the guidance path.

More particularly, the control module 218 may be configured to determine an instantaneous heading of the harvester 10 (e.g., the heading H1 in FIG. 4, or the heading H2 in FIGS. 5-7) and an actual direction of travel of the harvester 10 (e.g., direction of travel DOT1 in FIGS. 4-7) based at least in part on the location data stored in the sensor database 210. For instance, based on the location of each of the at least two antennas 104A, 104B on the harvester 10 at a given moment, the instantaneous heading of the harvester 10 may be defined. For example, a vector indicative of the heading may be defined along the distance D2 between the two points along the fore-aft direction FA1, with the arrow of the vector generally being pointed forward from the vehicle for forward gear travel and the arrow of the vector being pointed rearward from the vehicle for reverse gear travel. It should be appreciated that the antennas 104A, 104B may be laterally offset from each other in addition to the fore-aft distance D2, however, the vector for the heading is only defined by the fore-aft distance D2. Similarly, the movement or change in the location of the first antenna and/or the movement or change in the location of the second antenna over a given interval or period of time is/are indicative of the direction of travel of the harvester 10. Thereafter, the control module 218 may determine an angle (e.g., angle A1 in FIGS. 5-7) between the instantaneous heading and the actual direction of travel.

After determining the angle (e.g., angle A1 in FIGS. 5-7) between the instantaneous heading and the actual direction of travel, the control module 218 may be configured to perform a control action based at least in part on the angle A1. For instance, the control module 218 may directly control the operation of the row divider actuator(s) 89 to compensate for the angle (e.g., angle A1 in FIGS. 5-7) between the instantaneous heading and the actual direction of travel. For example, as shown in FIG. 6, the control module 218 may control the operation of the row divider actuator(s) 89 to move the row dividers 88 relative to the header frame 74 by a compensation angle (e.g., compensation angle A2 in FIG. 6) defined relative to the actual heading (e.g., heading H2 in FIG. 6) such that the row dividers 88 are better aligned with the crop rows 148, 150 while allowing hill-drift steering to continue. In some instances, the compensation angle A2 is substantially equal to the angle (e.g., angle A1) between the instantaneous heading and the actual direction of travel. Similarly, the control module 218 may additionally, or alternatively, be configured to control the operation of the lateral actuators 53 to pivot the feeder 42 to move the header 12 left and right relative to the frame 24 based on the angle (e.g., angle A1) between the instantaneous heading and the actual direction of travel. For example, as shown in FIG. 7, the control module 218 may control the operation of the lateral actuators 53 to pivot the feeder 42 relative to the frame 24 by a header compensation angle (e.g., header compensation angle A3 in FIG. 7) defined relative to the actual heading (e.g., heading H2 in FIG. 7) such that the row dividers 88 are better aligned with the crop rows 148, 150 while allowing hill-drift steering to continue. In some instances, the header compensation angle A3 is substantially equal to the angle (e.g., angle A1) between the instantaneous heading and the actual direction of travel. However, it should be appreciated that the control module 218 may control the operation of both the actuator(s) 53, 89 such that the sum of the compensation angles A2, A3 is substantially equal to the angle (e.g., angle A1) between the instantaneous heading and the actual direction of travel, if no other actuator (e.g., the steering actuator 40) is also being controlled, as described below.

It should be appreciated that, instead of, or in addition to, directly controlling the actuator(s) 53, 89 based on the angle (e.g., angle A1) between the instantaneous heading and the actual direction of travel, the control module 218 may instead control an operation of the user interface(s) 220 to indicate the angle A1 between the instantaneous heading and the actual direction of travel and/or to indicate the recommended control of the actuator(s) 53, 89 (e.g., to indicate the compensation angle(s) A2, A3).

Moreover, in some instances, the control module 218 may additionally, or alternatively, control an operation of the steering actuator 40 based at least in part on the angle (e.g., angle A1 in FIGS. 5-7) between the instantaneous heading and the actual direction of travel. For instance, the control module 218 may directly control the operation of the steering actuator 40 to compensate for the angle A1 between the instantaneous heading and the actual direction of travel. More particularly, the control module 218 may further determine a lateral offset L1 (FIG. 5) of the header 12 from a crop row, such as the lateral distance between the current position of the header 12 and the position of the header 12 if the angle A1 between the instantaneous heading and the actual direction of travel was zero. Generally, the harvester 10 turns about a pivot point defined laterally between the non-steerable wheels (e.g., forward wheels 26) when the steering angle is adjusted by the steering actuator 40. As such, the lateral offset L1 along the lateral direction 82 may be determined based on a fixed distance between the non-steerable axle and the front end 78 of the header 12 along the fore-aft direction FA1 (e.g., first distance DI between the first antenna 104A and the front end 78 of the header 12, when the first antenna 104A is substantially, directly vertically above the non-steerable axle) and the angle A1 between the instantaneous heading (e.g., heading H2) and the actual direction of travel (e.g., DOT1). For example, the lateral offset L1 may be determined by multiplying the fixed distance (e.g., first distance D1) by the sine of the angle A1 between the instantaneous heading (e.g., heading H2) and the actual direction of travel (e.g., DOT1). Based on the lateral offset L1, the control module 218 may control an operation of the steering actuator 40 to steer the harvester 10 along an updated guidance path offset by the lateral offset L1 (or only a portion of the lateral offset L1 when the operation of the actuator(s) 53, 89 is also being controlled to account for the angle A1) from the stored guidance path or generally to shift the harvester 10 by the lateral offset L1 (or the portion of the lateral offset L1) before returning to the hill-drift steering heading and direction of travel.

It should be appreciated that, when the first antenna 104A is not directly above the non-steerable axle, the fixed distance may be determined based at least in part on the first distance D1 and a distance along the fore-aft direction FA1 between the first antenna 104A and the non-steerable axle. For instance, if the first antenna 104A was forward of the non-steerable axle, the fixed distance would be equal to the first distance D1 minus the distance along the fore-aft direction FA1 and the first antenna 104A. Conversely, if the first antenna 104A was rearward of the non-steerable axle, the fixed distance would be equal to the first distance D1 plus the distance along the fore-aft direction FA1 and the first antenna 104A. It should further be appreciated that, instead of, or in addition to, directly controlling the steering actuator 40 based on the lateral offset L1, the control module 218 may instead control an operation of the user interface(s) 220 to indicate the lateral offset L1 and/or to indicate the recommended control of the steering actuator 40 based on the lateral offset L1. Additionally, it should be appreciated that the control module may perform any combination of the control actions described above.

The instructions 214, when executed by the processor(s) 204, may further configure the computing system 202 to execute a map module 222. For instance, when a guidance path is not already determined, the map module 222 may be configured to monitor the row data generated by the sensing device(s) 111A, 111B, 113 from the sensor data 210 to newly generate the guidance path. More particularly, the map module 222 may determine an adjusted lateral offset based on the data generated by the sensing device(s) 111A, 111B, 113 and the angle A1 between the heading and the direction of travel. For instance, in some embodiments, the angles 140, 142 determined from the sensing device(s) 111A, 111B may be offset by the angle A1 before the distances 130, 132 are determined. As an example, in some embodiments, when the angle A1 is oriented clockwise from the forward direction, the angle A1 may be subtracted from the angle 140 determined from the sensing device 111A and added to the angle 142 determined from the sensing device 111B, such that the difference between the distances 130, 132 determined from the adjusted angles 140, 142 is then indicative of the distance of the respective row divider(s) 88 from a centerline between adjacent crop rows 148, 150 and thus, the adjusted lateral offset that the harvester 10 must be moved (e.g., by indirectly or directly controlling the actuator(s) 53, 89 and/or the steering system 40 as described above). Similarly, the distance(s) 130, 132 determined from the data generated by the sensor(s) 113 may be, for example, adjusted by adding/subtracting the lateral offset L1 from the distance(s) 130, 132 to provide the adjusted lateral offset that the harvester 10 must be moved to improve the alignment of the crop dividers 88 within the crop rows. As such, the data from the sensing device(s) 111A, 111B, 113 calibrated by the angle A1 may be used to improve the alignment of the harvester 10 by the control module 218 during a harvesting pass without a guidance path, while the map module 222 records the position of the harvester 10 (e.g., the locations of the at least two antennas 104A, 104B) as a guidance path for subsequent operations within the field.

It should be appreciated that the computing system 202 may also include various other suitable components, such as a communications circuit or module 226, a network interface, one or more input/output channels, a data/control bus and/or the like, to allow the computing system 202 to be communicatively coupled with any of the various other system components described herein.

Referring now to FIG. 9, a flow diagram of one embodiment of a method 300 for accounting for hill-drift steering during row guidance of agricultural harvesters (e.g., harvester 10) is illustrated in accordance with aspects of the present subject matter. For purposes of discussion, the method 300 will generally be described herein with reference to the harvester 10 described with reference to the harvester 10 described with reference to FIGS. 1-2, the crop row sensor assembly 92 described with reference to FIG. 3, the example operating conditions of FIGS. 4-7, and the system 200 of FIG. 8. However, it should be appreciated that the disclosed method 300 may be used with any suitable agricultural work vehicle having any other suitable vehicle configuration, with any other crop row sensor assembly 92 having any other suitable sensor configuration, with any other applicable operating conditions, and/or with any other system having any other suitable sensor configuration. Additionally, although FIG. 9 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 9, at (302), the method 300 includes receiving location data generated by a location detecting system and indicative of a location of at least two points of the harvester spaced apart from each other and from a front end of the header. For instance, as discussed above, the computing system 202 may receive the location data generated by the location detecting system 100, the location data being indicative of a location of at least two points (e.g., of the antenna(s) 104A, 104B) of the harvester 10, the at least two points being spaced apart from each other and from a front end of the header 12 along the fore-aft direction FA1.

Moreover, at (304), the method 300 includes determining an instantaneous heading of the harvester and an actual direction of travel of the harvester based at least in part on the location data. For example, as described above, the computing system 202 may determine an instantaneous heading (e.g., heading H1 in FIG. 4 or heading H2 in FIGS. 5-7) of the harvester 10 and an actual direction of travel (e.g., direction of travel DOT1 in FIGS. 4-7) of the harvester 10 based at least in part on the location data generated by the location detecting system 100.

Additionally, at (306), the method 300 includes performing a control action associated with the harvester based at least in part on an angle between the instantaneous heading and the actual direction of travel. For instance, as described above, the computing system 202 may perform a control action associated with the harvester 10 based at least in part on an angle (e.g., angle A1 in FIGS. 5-7) between the instantaneous heading and the actual direction of travel. For example, the control action may include controlling an operation of the header actuator(s) 53, 89, an operation of the steering actuator 40, and/or an operation of the user interface(s) 220.

It is to be understood that the steps of the method 300 are performed by the computing system 202 upon loading and executing software code or instructions which are tangibly stored on a tangible computer readable medium, such as on a magnetic medium, e.g., a computer hard drive, an optical medium, e.g., an optical disk, solid-state memory, e.g., flash memory, or other storage media known in the art. Thus, any of the functionality performed by the computing system 202 described herein, such as the method 300, is implemented in software code or instructions which are tangibly stored on a tangible computer readable medium. The computing system 202 loads the software code or instructions via a direct interface with the computer readable medium or via a wired and/or wireless network. Upon loading and executing such software code or instructions by the computing system 202, the computing system 202 may perform any of the functionality of the computing system 202 described herein, including any steps of the method 300 described herein.

The term "software code" or "code" used herein refers to any instructions or set of instructions that influence the operation of a computer or computing system. They may exist in a computer-executable form, such as machine code, which is the set of instructions and data directly executed by a computer's central processing unit or by a computing system, a human-understandable form, such as source code, which may be compiled in order to be executed by a computer's central processing unit or by a computing system, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a computing system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An agricultural system that accounts for hill-drift steering during row guidance of harvesters, the agricultural system comprising:

a harvester comprising a main frame extending along a fore-aft direction and a header supported forward of the main frame along the fore-aft direction, the header comprising a plurality of row dividers coupled to a header frame and spaced apart along a lateral direction of the header, the header directing severed crop to a feeder of the harvester during a harvesting operation;

a location detecting system that generates location data indicative of a location of at least two points of the harvester, the at least two points being spaced apart from each other and from a front end of the header along the fore-aft direction;

a crop row sensor that generates data indicative of a distance of a row divider of the plurality of row dividers relative to a crop row; and a computing system that:

receives the location data generated by the location detecting system;

determines an instantaneous heading of the harvester and an actual direction of travel of the harvester based at least in part on the location data;

determines an adjusted lateral offset of the row divider of the plurality of row dividers from the crop row based at least in part on the data generated by the crop row sensor and an angle between the instantaneous heading and the actual direction of travel; and performs a control action based at least in part on the angle between the instantaneous heading and the actual direction of travel.

2. The agricultural system of claim 1, wherein the computing system determines the instantaneous heading of the harvester based at least in part on a vector defined between the at least two points of the harvester at a given moment and determines the actual direction of travel of the harvester based on movement of the at least two points of the harvester over a period of time including the given moment.

3. The agricultural system of claim 1, wherein the computing system further determines a lateral offset of the header from a crop row based at least in part on the angle between the instantaneous heading and the actual direction of travel and a fixed distance, the fixed distance being based at least in part on a distance along the fore-aft direction between the front end of the header and the location detecting system.

4. The agricultural system of claim 3, wherein the computing system to determines the lateral offset of the header from the crop row by multiplying the fixed distance by a sine of the angle between the instantaneous heading and the actual direction of travel.

5. The agricultural system of claim 3, further comprising a user interface associated with the harvester, wherein the control action comprises controlling an operation of the user interface based at least in part on the lateral offset.

6. The agricultural system of claim 3, wherein the control action comprises automatically controlling an operation of a steering system of the harvester based at least in part on the lateral offset.

7. The agricultural system of claim 1, wherein the control action comprises controlling an operation of at least one actuator that either moves one or both of the plurality of row dividers relative to the header frame or the header frame relative to the main frame based at least in part on the angle between the instantaneous heading and the actual direction of travel.

8. The agricultural system of claim 1, wherein the computing system performs the control action based at least in part on the adjusted lateral offset.

9. The agricultural system of claim 1, wherein the location detecting system comprises an antenna at each of the at least two points of the harvester and at least one receiver in communication with the antenna at each of the at least two points of the harvester.

10. An agricultural method that accounts for hill-drift steering during row guidance of a harvester, the agricultural method comprising:

receiving, with a computing system, location data generated by a location detecting system, the location data being indicative of a location of at least two points of the harvester, the at least two points being spaced apart from each other and from a front end of a header, and the header comprises a plurality of row dividers coupled to a header frame and spaced apart along a lateral direction of the header;

receiving, with the computing system, data generated by a crop row sensor, the data being indicative of a distance of a row divider of the plurality of row dividers relative to a crop row;

determining, with the computing system, an instantaneous heading of the harvester and an actual direction of travel of the harvester based at least in part on the location data;

determining, with the computing system, an adjusted lateral offset of the row divider of the plurality of row dividers from the crop row based at least in part on the data generated by the crop row sensor and an angle between the instantaneous heading and the actual direction of travel; and performing, with the computing system, a control action associated with the harvester based at least in part on the angle between the instantaneous heading and the actual direction of travel;

wherein the harvester comprises a main frame extending along a fore-aft direction and a header supported forward of the main frame along the fore-aft direction; and wherein the header delivers severed crop to a feeder of the harvester during a harvesting operation.

11. The agricultural method of claim 10, wherein the determining the instantaneous heading of the harvester comprises determining the instantaneous heading of the harvester based at least in part on a vector defined between the at least two points of the harvester at a given moment, and wherein the determining the actual direction of travel of the harvester comprises determining the actual direction of travel of the harvester based on movement of the at least two points of the harvester over a period of time including the given moment.

12. The agricultural method of claim 10, further comprising:

determining, with the computing system, a lateral offset of the header from a crop row based at least in part on the angle between the instantaneous heading and the actual direction of travel and a fixed distance, the fixed distance being based at least in part on a distance along the fore-aft direction between the front end of the header and the location detecting system.

13. The agricultural method of claim 12, wherein the determining the lateral offset of the header comprises multiplying the fixed distance by a sine of the angle between the instantaneous heading and the actual direction of travel.

14. The agricultural method of claim 12, wherein the performing the control action comprises controlling an operation of a user interface associated with the harvester based at least in part on the lateral offset.

15. The agricultural method of claim 12, wherein the performing the control action comprises automatically controlling an operation of a steering system of the harvester based at least in part on the lateral offset.

16. The agricultural method of claim 10, wherein the performing the control action comprises controlling an operation of at least one actuator that either moves one or both of the plurality of row dividers relative to the header frame or the header frame relative to the main frame based at least in part on the angle between the instantaneous heading and the actual direction of travel.

17. The agricultural method of claim 10, wherein the determining the adjusted lateral offset comprises determining the adjusted lateral offset of the row divider of the plurality of row dividers from the crop row based at least in part on the data generated by the crop row sensor and the angle between the instantaneous heading and the actual direction of travel when a guidance path along the crop row is newly being generated during the harvesting operation.

18. The agricultural method of claim 10, wherein the receiving the location data comprises receiving the location data generated by the location detecting system comprising an antenna at each of the at least two points of the harvester and at least one receiver in communication with the antenna at each of the at least two points of the harvester.

* * * * *